United States Patent
Carugati et al.

(10) Patent No.: US 7,998,248 B2
(45) Date of Patent: Aug. 16, 2011

(54) PROCESS FOR THE DEHYDRATION OF GASES

(75) Inventors: Angelo Carugati, Rovellasca (IT); Roberto Pea, Milan (IT); Liberato Giampaolo Ciccarelli, San Giuliano Milanese (IT)

(73) Assignee: ENI S.p.A., Rome (IT)

( * ) Notice: Subject to any disclaimer, the term of this patent is extended or adjusted under 35 U.S.C. 154(b) by 837 days.

(21) Appl. No.: 11/721,239

(22) PCT Filed: Nov. 29, 2005

(86) PCT No.: PCT/EP2005/012905
§ 371 (c)(1),
(2), (4) Date: Feb. 1, 2008

(87) PCT Pub. No.: WO2006/061148
PCT Pub. Date: Jun. 15, 2006

(65) Prior Publication Data
US 2009/0235820 A1     Sep. 24, 2009

(30) Foreign Application Priority Data
Dec. 10, 2004   (IT) ............... MI2004A2352

(51) Int. Cl.
*B01D 53/14*     (2006.01)
(52) U.S. Cl. ........ 95/179; 95/190; 95/193; 95/209; 95/231
(58) Field of Classification Search .......... 95/190, 95/193–194, 209, 231, 176–179
See application file for complete search history.

(56) References Cited

U.S. PATENT DOCUMENTS

| | | | | |
|---|---|---|---|---|
| 2,438,368 A | * | 3/1948 | Keeling ............... | 585/807 |
| 2,455,803 A | * | 12/1948 | Pierotti ............... | 203/51 |
| 3,321,890 A | * | 5/1967 | Barnhart .............. | 95/192 |
| 3,349,544 A | * | 10/1967 | Scholten et al. ...... | 95/190 |
| 3,867,112 A | * | 2/1975 | Honerkamp et al. .... | 203/18 |
| 4,005,997 A | * | 2/1977 | Fowler et al. ........ | 95/190 |
| 4,524,220 A | * | 6/1985 | Law ................... | 564/307 |
| 4,775,395 A | * | 10/1988 | Rojey et al. .......... | 95/190 |

FOREIGN PATENT DOCUMENTS

| | | | |
|---|---|---|---|
| GB | 1 195 418 | | 6/1970 |
| GB | 1195418 | * | 6/1970 |

OTHER PUBLICATIONS

"Hawley's Condensed Chemical Dictionary" 11$^{th}$ Ed., p. 327.*

* cited by examiner

*Primary Examiner* — Duane Smith
*Assistant Examiner* — Ives Wu
(74) *Attorney, Agent, or Firm* — Oblon, Spivak, McClelland, Maier & Neustadt, L.L.P.

(57) ABSTRACT

Process for the dehydration of gases, comprising: absorbing water vapor by means of a hygroscopic liquid consisting essentially of one or more $C_2$-$C_8$ glycols and an additive capable of forming a minimum type azeotrope with water; distilling the glycol/water/additive mixture to obtain a top product consisting mainly of the water/additive azeotropic mixture and a bottom product consisting mainly of glycol and additive (hygroscopic liquid); recycling the regenerated hygroscopic liquid to the absorption stage.

17 Claims, 1 Drawing Sheet

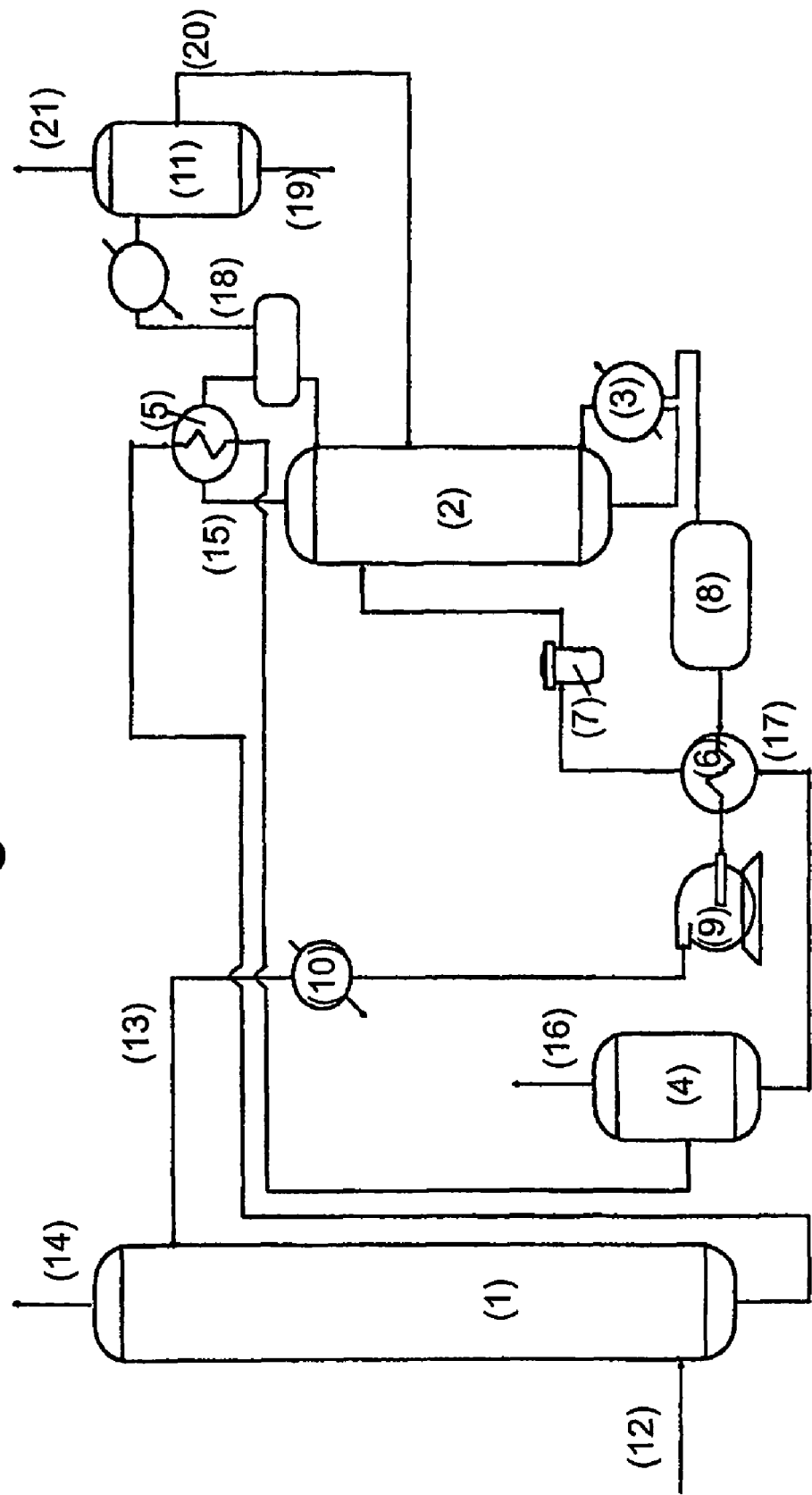
Figure

PROCESS FOR THE DEHYDRATION OF GASES

The present invention concerns a process for the dehydration of gases.

More in particular, the present invention concerns a process for the dehydration of a gas by means of the use of hygroscopic liquids.

Still more in particular, the present invention concerns a process for the dehydration of a gas by means of the use of hygroscopic liquids followed by their regeneration and recycling.

Many industrial gases, such as natural gas or refinery gas, may contain dissolved water vapour in variable quantities depending on the temperature and pressure. Dehydration treatments can prevent the formation of ice and/or hydrates (that may occur following changes in the pressure and/or the cooling of the gas) and help to reduce the phenomenon of corrosion in the pipes, valves and devices during the transportation, storage and use of the gas.

There are at least three commercial/industrial methods for removing water vapour from gases: absorption with hygroscopic liquids, adsorption with dehydrating solids and condensation by means of compression and/or cooling. Amongst these methods, dehydration with hygroscopic liquids (especially glycols) is the most commonly used method. Amongst conventionally used glycols, for instance in the dehydration of natural gas, triethylene glycol (TEG) is the most commonly used glycol though other glycols and polyglycols with a number of carbon atoms ranging between 2 and 8 are also used. These products are used due to their high hygroscopicity, their relatively low vapour pressure and their relatively good chemical stability.

In a typical plant for removing water vapour from gaseous streams, a stream of glycol containing an amount of water generally lower than 2% by weight is brought into contact with the gas in an absorption column, in conditions of counter-current flow, so that the moisture in the gas can be absorbed. The temperature in the absorption column is usually not higher than 40° C. In fact, low temperatures improve the absorption of water and make it possible to minimise further losses of glycol while too low temperatures should be avoided because the efficiency of the mass transfer decreases as the viscosity of the glycol increases. For instance, if TEG is used, it is recommended that the temperature in the column should not drop below 16° C.

The water enriched glycol phase is removed from the bottom of the absorption column, generally passes through a condenser, a flash tank, a heat exchanger and it is sent to the regenerator where the remaining absorbed water is separated from the glycol by means of distillation. Glycol regenerators normally work at a pressure close to the atmospheric pressure.

The need to minimise degradation of the glycol determines, for each type of glycol, the maximum temperature at which the reboiler works and this will influence the purity of the regenerated glycol, which is then fed to the head of the absorption column. Table 1 below, only by example, provides some data relevant to the maximum temperature at which glycols should be treated and, therefore, to the maximum degree of purity that can be reached with the various types of glycol during their regeneration at atmospheric pressure and in the absence of stripping gas.

TABLE 1

| | EG $C_2H_6O_2$ | DEG $C_4H_{10}O_3$ | TEG $C_6H_{14}O_4$ | TETRA-EG $C_8H_{18}O_5$ |
|---|---|---|---|---|
| Molecular weight | 62 | 106 | 150 | 194 |
| Specific weight (g/cm³) | 1.115 | 1.118 | 1.125 | 1.244 |
| Melting point (° C.) | −13 | −10 | −7 | −5 |
| Boiling point (atm. ° C.) | 197 | 245 | 286 | 314 |
| Vapour pressure at 25° C. (Pa) | 12.24 | 0.27 | 0.05 | 0.007 |
| Max working temperature - $T_{max}$ (° C.) (*) | 163 | 177 | 204 | 225 |
| Max purity (% mass) (**) | 95.8 | 97.0 | 98.6 | 99.3 |
| Dew point - max depress. (° C.) | 12 | 16 | 29 | 35 |

(*) temperature above which the glycol decomposition increases rapidly
(**) maximum concentration allowable in a reboiler at atmospheric pressure Since the dehydration rate of the used glycol has a significant impact on the efficiency of the gas dehydration treatment, several different methods and processes have been developed to increase the rate of dehydration to above the values shown in Table 1. These are all based on the principle of reducing the partial $H_2O$ pressure in the vapour phase of the glycol regenerator.

Two of the most commonly used methods for reducing the partial water pressure in the regenerator are: the use of a stripping gas during the regeneration and the lowering of the regenerator operating pressure below the atmospheric pressure. Both these solutions have the disadvantage of increasing the problems linked to the emission of pollutants (hydrocarbons, especially BTX that may be present in natural gas), which can then flow in the top gaseous effluents of the regenerator. In such cases, the gas must be either treated or burnt off.

The Applicants have now found a process for the dehydration of gases, via absorption with hygroscopic liquids, that offers greater efficiency in removing water from the gases, if compared to the processes of the prior art, and that does not show the above mentioned disadvantages.

Therefore, object of the present invention is a process for the dehydration of gases, for instance natural gas, comprising:

a. absorbing water vapour by means of a hygroscopic absorption liquid consisting essentially of one or more C2-C8 glycols and an additive capable of forming a minimum type azeotrope with water, selected from the group consisting of:
   aliphatic alcohols with a number of carbon atoms ranging from 5 to 8, or mixtures thereof; and
   cumene (isopropylbenzene) with a glycol/water vapour molar ratio of from 6.5 to 65;

b. distilling the glycol/water/additive mixture to obtain a top product consisting essentially of the azeotropic mixture (additive+water) and a bottom product consisting essentially of glycol and additive;

c. recycling the distillation bottom product (hygroscopic absorption liquid) to the absorption stage;

d. separating, in a at least two phase separator, the distillation top product which separates into one phase consisting essentially of the additive, recycled to distillation, and one phase consisting essentially of water, discharged outside the plant.

According to this invention, the additive may be used in concentrations of from 2 to 20% by weight with respect to the glycol. Preferred additive is selected amongst cumene or an aliphatic alcohol with a number of carbon atoms of 6 or 7, or a mixture thereof.

The absorption of the water vapour takes place in a plate type column or in a packed column, wherein the packing is arranged either in order or in bulk, by feeding the wet gas at the bottom and the hygroscopic liquid at the head of the column. Absorption normally takes place at the temperature of from 10 to 50° C. and at the available gas pressure. In the case of natural gas, absorption may occur at the pressure available at the bank of the production well or at a pressure that is substantially similar to the pressure at the bank when the gas comes from previous purification treatments, such as the elimination/reduction of nitrogen or hydrogen sulphide, or any other pollutants possibly present.

After dehydration of the gas, the water enriched absorption liquid is sent to the regeneration plant. Regeneration normally takes place at ambient pressure in a distillation column working at a bottom temperature (the reboiler temperature) in the range of from 150 to 225° C. and this temperature must not, in any case, exceed the maximum working temperatures for each type of glycol employed, as shown in Table 1. In the case of the dehydration of natural gas, performed mainly at the pressure available at the bank of the production well, the hygroscopic liquid, after absorption, is subjected to one or more stages of expansion, mainly up to the pressure of the distillation column, before being sent to the same distillation column.

The absorption liquid is extracted from the bottom of the distillation column, wherein the residual concentration of water is always lower than that obtainable in the absence of the additive, all other working conditions being the same. After losing its heat in suitable heat exchangers, this stream is pumped by a system of pumps to the working pressure of the absorption column and is then fed to the same. The light fraction is recovered from the top of the column, it is condensed and then sent to a at least two phase separator where separates into two phases, one consisting of a water/additive mixture that is then recycled to the distillation column and the other consisting of the excess water recovered during the absorption stage, which is then discharged. Generally, the separator may also be of a three phase type when non-condensing gases are also present in the top stream.

The process for the dehydration of gases, object of the present invention, can be better understood by referring to the drawing of the attached FIGURE which shows an exemplificative and not limitative embodiment thereof.

With reference to this FIGURE, the present process can be carried out through a device that includes a plate-type absorption column (1) and a distillation column (2) equipped with a reboiler (3). The device also includes an expansion unit (4), two heat exchangers (5) and (6) serving the distillation column (2), a filtering unit (7), an accumulation tank (8), a recycling pump (9), a cooling device (10) to cool the recycled hygroscopic liquid to the working temperature of the absorption column (1) and, finally, a three phase separator (11) to separate the top products coming from the distillation column (2).

The wet gas (12) is fed to the bottom of the plate-type absorption column (1) while the regenerated hygroscopic liquid (13) is fed to the top thereof. As the gas flows up the column, it meets the liquid coming down, is dehydrated and is then vented at the top by means of (14).

The water enriched absorption liquid is fed to the first heat exchanger (5) where the top products (15) of the distillation column (2) are condensed, it is then made to expand in the expansion unit (4) from which the expansion gases are vented (16) and, then, it flows as stream (17) into the heat exchanger (6), where it is heated to the feeding temperature for the distillation column (2), and into the filtering unit (7).

The top product of the distillation column (2) is sent via (18) to a three phase separator (11) in order to obtain a lower liquid phase (19), consisting essentially of water extracted from the gas in (1), which is then sent to the water treatment plants, a higher liquid phase (20) (additive+water) which is recycled to the column (2) and, possibly, a gaseous stream (21), to be sent to the incinerator or directly to the vent.

The regenerated hygroscopic liquid is recycled to the absorption column (1). More specifically, the bottom stream is heated to the maximum working temperature of the distillation column in the reboiler (3), then it is partially recycled to the distillation column and partially sent to an accumulation tank (8), cooled in the heat exchanger (6) and fed back to the column (1) by the pump (9), as stream (13). If necessary, the cooling device (10) can reduce the temperature of the liquid stream (13) to the optimal value needed to dehydrate the gas.

By referring to the drawing of the attached FIGURE, some illustrative and not limitative examples are reported hereinbelow.

EXAMPLE 1

Comparative

Experimental verification of the material balances for the distillation unit (2) and the separator (11) has been carried out using the bench scale unit. The distiller has been made to run at a boiler temperature of 200° C. and at a pressure of 102 kPa. The distillate has been collected, quantified and analysed. Where the distillate has separated into several phases, the individual phases have been separated, quantified and analysed. The material balances for each test were closed with a high degree of accuracy.

Table 2 shows the results for a $H_2O$/triethylene glycol mixture:

TABLE 2

| Distillation column (2) and separator (11) balance Working conditions for reboiler (3): T = 200° C. P = 102 kPa | | | | |
|---|---|---|---|---|
| Stream | (17) | (20) | (19) | (13) |
| Distribution (% weight) [1] | 100.00 | 0.00 | 3.09 | 96.91 |
| $H_2O$ (% weight) | 4.65 | 0.00 | 100.00 | 1.61 |
| Triethylene glycol (% weight) | 95.35 | 0.00 | 0.00 | 98.39 |

[1] (17) + (20) = 100; (19) + (13) = (17)

EXAMPLE 2

Table 3 shows the results obtained for a $H_2O$/1-hexanol/triethylene glycol mixture, using the same working conditions as in Example 1 above:

TABLE 3

| Distillation column (2) and separator (11) balance Working conditions for reboiler (3): T = 200° C. P = 102 kPa | | | | |
|---|---|---|---|---|
| Stream | (17) | (20) | (19) | (13) |
| Distribution (% weight) [1] | 98.11 | 1.89 | 4.27 | 93.84 |
| $H_2O$ (% weight) | 4.97 | 6.90 | 100.00 | 0.65 |
| 1-hexanol (% weight) | 7.58 | 93.10 | 0.00 | 7.93 |
| Triethylene glycol (% weight) | 87.44 | 0.00 | 0.00 | 91.42 |

[1] (17) + (20) = 100; (19) + (13) = (17)

EXAMPLE 3

Table 4 shows the results obtained for a second H₂O/1-hexanol/triethylene glycol mixture, using the same working conditions as in Example 2 above:

TABLE 4

Distillation column (2) and separator (11) balance
Working conditions for reboiler (3): T = 200° C. P = 102 kPa

| Stream | (17) | (20) | (19) | (13) |
|---|---|---|---|---|
| Distribution (% weight) [1] | 94.43 | 5.57 | 4.41 | 90.02 |
| H₂O (% weight) | 4.83 | 6.52 | 99.78 | 0.17 |
| 1-hexanol (% weight) | 9.15 | 93.48 | 0.22 | 9.59 |
| Triethylene glycol (% weight) | 86.02 | 0.00 | 0.00 | 90.24 |

[1] (17) + (20) = 100; (19) + (13) = (17)

EXAMPLE 4

Table 5 shows the results obtained for a second H₂O/1-heptanol/triethylene glycol mixture, using the same working conditions as in Example 1 above:

TABLE 5

Distillation column (2) and separator (11) balance
Working conditions for reboiler (3): T = 200° C. P = 102 kPa

| Stream | (17) | (20) | (19) | (13) |
|---|---|---|---|---|
| Distribution (% weight) [1] | 98.72 | 1.28 | 4.28 | 94.44 |
| H₂O (% weight) | 4.81 | 5.21 | 99.71 | 0.51 |
| 1-heptanol (% weight) | 12.88 | 94.79 | 0.29 | 13.45 |
| Triethylene glycol (% weight) | 82.31 | 0.00 | 0.00 | 86.04 |

[1] (17) + (20) = 100; (19) + (13) = (17)

EXAMPLE 5

Table 6 shows the results obtained for a H₂O/cumene/triethylene glycol mixture, using the same working conditions as in Example 1 above:

TABLE 6

Distillation column (2) and separator (11) balance
Working conditions for reboiler (3): T = 200° C. P = 102 kPa

| Stream | (17) | (20) | (19) | (13) |
|---|---|---|---|---|
| Distribution (% weight) [1] | 93.48 | 6.52 | 4.35 | 89.12 |
| H₂O (% weight) | 5.02 | 0.06 | 100.00 | 0.38 |
| Cumene (% weight) | 2.93 | 99.94 | 0.00 | 3.07 |
| Triethylene glycol (% weight) | 92.05 | 0.00 | 0.00 | 96.55 |

[1] (17) + (20) = 100; (19) + (13) = (17)

EXAMPLE 6

Table 7 shows the results obtained for a second H₂O/cumene/triethylene glycol mixture, using the same working conditions as in Example 5 above:

TABLE 7

Distillation column (2) and separator (11) balance
Working conditions for reboiler (3): T = 200° C. P = 102 kPa

| Stream | (17) | (20) | (19) | (13) |
|---|---|---|---|---|
| Distribution (% weight) [1] | 89.98 | 10.02 | 4.30 | 85.67 |
| H₂O (% weight) | 5.01 | 0.06 | 100.00 | 0.24 |
| Cumene (% weight) | 4.07 | 99.94 | 0.00 | 4.27 |
| Triethylene glycol (% weight) | 90.92 | 0.00 | 0.00 | 95.49 |

[1] (17) + (20) = 100; (19) + (13) = (17)

The invention claimed is:

1. A process for the dehydration of gases, comprising:
   a. absorbing water vapor by means of a hygroscopic liquid consisting essentially of one or more C2-C8 glycols and an additive capable of forming a minimum type azeotrope with water, selected from the group consisting of:
      aliphatic alcohols with a number of carbon atoms ranging from 5 to 8, or mixtures thereof; and
      cumene (isopropylbenzene)
      with a glycol/water vapor molar ratio of from 6.5 to 65, wherein the additive is used in concentrations of from 2 to 20% by weight, with respect to the glycol;
   b. distilling the glycol/water/additive mixture to obtain a top product consisting essentially of the azeotropic mixture (additive+water) and a bottom product consisting essentially of glycol and additive;
   c. recycling the distillation bottom product (hygroscopic absorption liquid) to the absorption stage; and
   d. separating, in an at least two phase separator, the distillation top product which separates into one phase consisting essentially of the additive, to be recycled to distillation, and one phase consisting essentially of water, to be discharged outside the plant.

2. The process according to claim 1, wherein the additive is selected from cumene or an aliphatic alcohol with a number of carbon atoms of 6 or 7, or a mixture thereof.

3. The process according to claim 2, wherein the additive is 1-hexanol or 1-heptanol or a mixture thereof.

4. The process according to claim 1, wherein the absorption takes place at a temperature of from 10 to 50° C.

5. The process according to claim 1, wherein the gas is natural gas.

6. The process according to claim 1, wherein the additive is cumene.

7. The process according to claim 1, wherein additive is an aliphatic alcohol having 6 or 7 carbon atoms.

8. The process according to claim 1, wherein the distilling the glycol/water/additive mixture is conducted at a temperature of 150 to 225° C.

9. A process for the dehydration of gases, comprising:
   a. absorbing water vapor from a gas with a hygroscopic liquid consisting essentially of (1) one or more C2-C8 glycols and (2) an additive capable of forming a minimum type azeotrope with water and selected from the group consisting of:
      aliphatic alcohols with a number of carbon atoms ranging from 5 to 8, or mixtures thereof and
      cumene,
      with a glycol/water vapor molar ratio of from 6.5 to 65, wherein the additive is used in an amount of from 2 to 20% by weight, with respect to the glycol;
   b. distilling the glycol/water/additive mixture to obtain a top product consisting essentially of the additive and water as an azeotropic mixture and a bottom product consisting essentially of glycol and additive;

c. recycling the bottom product to (a); and
d. separating, in an at least two phase separator, the top product which separates into one phase consisting essentially of the additive and one phase consisting essentially of water.

10. The process according to claim 9, wherein the gas is natural gas.

11. The process according to claim 9, wherein the additive is an aliphatic alcohol having 6 or 7 carbon atoms.

12. The process according to claim 9, wherein the additive is 1-hexanol or 1-heptanol or a mixture thereof.

13. The process according to claim 9, wherein the additive is cumene.

14. The process according to claim 9, wherein the absorption is conducted at a temperature of from 10 to 50° C.

15. The process according to claim 9, wherein the distilling the glycol/water/additive mixture is conducted at a temperature of 150 to 225° C.

16. The process according to claim 9, further comprising recycling the one phase consisting essentially of the additive to the distillation.

17. The process according to claim 9, further comprising discharging the one phase consisting essentially of water.

* * * * *